United States Patent Office 3,795,679
Patented Mar. 5, 1974

3,795,679
1,2,4-4H-TRIAZOLE DERIVATIVES
Michael C. Seidel, Levittown, William C. von Meyer, Willow Grove, and Stanley A. Greenfield, Ambler, Pa., assignors to Rohm and Haas Company, Philadelphia, Pa.
No Drawing. Continuation-in-part of abandoned application Ser. No. 67,198, Aug. 26, 1970, which is a continuation-in-part of application Ser. No. 847,481, July 3, 1969, now Patent No. 3,701,784, which in turn is a continuation-in-part of application Ser. No. 757,490, Sept. 4, 1968, now Patent No. 3,769,411, dated Oct. 30, 1973. This application June 8, 1972, Ser. No. 263,726
Int. Cl. C07d 91/46
U.S. Cl. 260—305               1 Claim

ABSTRACT OF THE DISCLOSURE

Substituted 1,2,4-4H-triazoles of the formula

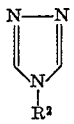

wherein $R^2$ is a heterocyclic radical. These compounds are fungicides and are particularly useful for the control of cereal rusts.

---

This application is a continuation-in-part of U.S. Ser. No. 67,198, filed Aug. 26, 1970, now abandoned, which in turn is a continuation-in-part of U.S. Ser. No. 847,481, filed July 3, 1969, now U.S. Pat. 3,701,784, which in turn is a continuation-in-part of Ser. No. 757,490, filed Sept. 4, 1968, now U.S. Pat. 3,769,411, issued Oct. 30, 1973. This invention is concerned with substituted 1,2,4-4H-triazoles, hereinafter termed 1,2,4-triazoles, which possess fungicidal properties useful for the control of fungal diseases on plants and in some instances herbicidal properties and to agricultural compositions containing them. It also relates to certain of these 1,2,4-triazoles which are novel compounds and to their method of preparation. Further, it relates to certain 1,2,4-triazoles which are useful as systemic fungicides for the control of a rust disease, as on a cereal crop.

The chemistry of the 1,2,4-triazoles has been reviewed by K. T. Potts in Chemical Reviews, 61, 87–127 (1961). A few such compounds are known to possess biological properties. 3-amino-1,2,4-triazole is a commercial heribicide, and thiocarbamyl derivatives of it possess fungicidal properties useful for paints according to French Pat. 1,425,253. Japanese patent publication 11,480/66 disclosed certain 3 - mercapto - 4 - amino-5-(substituted-methyl)-1,2,4-4H-triazoles as fungicides. 5-amino-1-[bis-(dimethylamino) - phosphenyl] - 3 - phenyl - 1,2,4-triazole is a known fungicide. U.S. Pat. 3,308,131 discloses among others 3-mercapto-1-(substituted-carbamyl)-1,2,4-triazoles useful as insecticides.

Relatively few compounds are known to control fungal rust organisms and still fewer which control them by systemic action. Rust fungicides include symmetrical-dichlorotetrafluoroacetone, ethylenebisdithiocarbamates, nickel compounds, phenyl-hydrazones, cycloheximide and certain carboxamido oxathiins.

The substituted 1,2,4-triazoles of this invention which have been found useful as fungicides for the control of phytopathogenic fungi are represented by the general formula

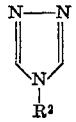

wherein $R^2$ is a heterocyclic group selected from the group consisting of 2-pyridyl, 4-pyridyl, 2-pyrimidyl, 3-(and 4-)-1,2,4-triazyl, 1-morpholinyl, 2-thiazyl, 2-benzothiazyl, 2-benzimidazolyl and their halo preferably chloro substituted derivatives.

Various methods are available for the preparation of the compounds of Formula I.

The method of Bartlett and Humphrey, J. Chem. Soc., 1967, 1664–1666, involving a transamination of N,N-dimethylformamide azine may be used; thus $$Me_2NCH=N—N=CHMe_2+R^2NH_2 \rightarrow 2Me_2NH+(I)$$

The reaction usually involves heating to remove the dimethylamine and may be run in the presence of a solvent such as an aromatic hydrocarbon. An acidic catalyst may be used.

The method of Pellizzari (Chemical Reviews, 61, 95 (1961)) involves diformhydrazide with primary amines; thus $$OCHNHNHCHO+R^2NH_2 \rightarrow 2H_2O+(I)$$

The method of U.S. Pat. 3,647,814 which involves reaction of a primary amine with an N-alkoxymethylene-N'-formylhydrazine.

Salts of various of the substituted 1,2,4-triazoles may be made by methods known to one skilled in the art. Thus, the basic 1,2,4-triazoles may be reacted with mineral and organic acids, e.g. see Ainsworth et al., J. Med. Pharm. Chem., 5, 383 (1962).

Details of preparing the compounds of this invention are given in the following examples which are presented for purposes of illustration and are not intended to limit the scope of the invention. Table I lists by structure and name, compounds prepared by the above-described processes and constitutes Examples 1 through 11. Table II gives physical characteristics and analyses or literature references for these examples. An illustrative preparation of Example 9 is set forth below.

EXAMPLE 9

Preparation of 4-(2-benzothiazyl)-1,2,4-triazole

A reaction mixture consisting of 10 g. (0.0705 mole) of N,N-dimethylformamide azine, 10.6 g. (0.0705 mole) of 2-aminobenzothiazole, 0.6 g. of p-toluenesulfonic acid and 200 ml. of dimethyl formamide was refluxed 16 hrs., then stripped of solvent. The residue was recrystallized twice from ethanol to give 2.5 g. of solid melting at 199–201° C. This was 4-(2-benzothiazyl)-1,2,4-triazole.

TABLE I
1,2,4-triazole examples

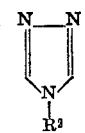

| Ex. No. | $R^1$ | $R^2$ | $R^3$ | Name |
|---|---|---|---|---|
| 1 | H | 4-pyridyl | H | 4-(4-pyridyl)-1,2,4-triazole. |
| 2 | H | 2-pyridyl | H | 4-(2-pyridyl)-1,2,4-trizaole. |
| 3 | H | 5-chloro-2-pyridyl | H | 4-(5-chloro-2-pyridyl-)1,2,4-triazole. |
| 4 | H | 4-morpholinyl | H | 4-(1-morpholinyl)-1,2,4-triazole. |
| 5 | H | 4-(1,2,4-triazyl) | H | 4-(4-(1,2,4-triazyl)-1,2,4-triazole. |
| 6 | H | 3-(1,2,4-triazyl) | H | 4-(3-(1,2,4-triazyl)-1,2,4-triazole. |
| 7 | H | 2-pyrimidyl | H | 4-(2-pyrimidyl)-1,2,4-triazole. |
| 8 | H | 2-thiazyl | H | 4-(2-thiazyl)-1,2,4-triazole. |
| 9 | H | 2-benzothiazyl | H | 4-(2-benzothiazyl)-1,2,4-triazole. |
| 10 | H | 2-(4-chlorobenzothiazyl) | H | 4-(2-(4-chlorobenzothiazyl)-1,2,4-triazole. |
| 11 | H | 2-benzimidazolyl | H | 4-(2-benzimidazolyl)-1,2,4-triazole. |

TABLE II

| Example number | Melting point (° C.) | Empirical formula | C | H | N | S |
|---|---|---|---|---|---|---|
| 1 | 230–231 | C₇H₆N₄ | 57.8 (57.5) | 4.0 (4.1) | 38.1 (38.4) | |
| 2 | 162–163 | C₇H₆N₄ | J. Org. Chem. 18, 1368 (1953) | | | |
| 3 | 217–128 | C₇H₅ClN₄ | 47.0 (46.5) | 2.8 (2.8) | 30.8 (31.0) | |
| 4 | 148–150 | C₈H₁₀N₄O | 44.8 (46.8) | 6.7 (6.5) | 35.4 (36.3) | |
| 5 | 276–277 | C₄H₄N₆ | J. Chem. Soc. 1967, 1966 | | | |
| 6 | 190–195 | C₄H₄N₆ | J. Org. Chem. 18, 1368 (1953) | | | |
| 7 | 246–249 | C₆H₅N₅ | 49.2 (49.0) | 3.3 (3.4) | 47.6 (47.6) | |
| 8 | 127–129 | C₅H₄N₄S | 39.5 (39.5) | 2.5 (2.7) | 37.2 (36.8) | |
| 9 | 199–201 | C₉H₆N₄S | 54.0 (53.5) | 3.3 (3.0) | 27.6 (27.7) | |
| 10 | 187–189 | C₉H₅ClN₄S | 46.6 (45.7) | 2.7 (2.1) | 24.1 (23.7) | |
| 11 | 303–305 | C₉H₇N₅ | 57.7 (58.4) | 4.2 (3.8) | 35.9 (37.8) | |

[1] The number in parentheses represents the theoretical value as calculated from the empirical formula.

Among the structures of this invention which are fungicidal the preferred compounds are those which are novel. Novel structures within this invention may be represented by the structure

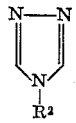

wherein R² is a heterocyclic group selected from the group consisting of (a) 2-thiazyl, 2-pyrimidyl, morpholinyl, 2-benzothiazyl, (b) the monochlorinated derivatives of the above groups and (c) chlorinated 2-pyridyl.

The 1,2,4-triazoles of this invention and salts thereof possess biocidal properties and in this respect are particularly useful as agricultural fungicides. As such, they may be applied to various loci such as the seed, the soil or the foliage. For such purposes the 1,2,4-triazoles may be used in the technical or pure form as prepared, as solutions or as formulations. The compounds are usually taken up in a carrier or are formulated so as to render them suitable for subsequent dissemination as pesticides. For example, the 1,2,4-triazoles may be formulated as wettable powders, emulsifiable concentrates, dusts, granular formulations, aerosols, flowable emulsion concentrates. In such formulations, the compounds are extended with a liquid or solid carrier and, when desired, suitable surfactants are incorporated.

It is usually desirable, particularly in the case of foliar spray formulations, to include adjuvants, such as wetting agents, spreading agents, dispersing agents, stickers, adhesives and the like in accordance with agricultural practices. Such adjuvants commonly used in the art may be found in the John W. McCutcheon, Inc. publication "Detergents and Emulsifiers 1967 Annual." Of course the surfactant should be selected relative to the specific triazole. In some instances the cationic 1,2,4-triazole salts may be incompatible with anionic surfactants and the anionic 1,2,4-triazole salts may be incompatible with cationic surfactants.

In case the 1,2,4-triazole compound is water-soluble, it may be dissolved directly in water to provide an aqueous solution for application. Similarly, the compounds of this invention may be dissolved in a water-miscible liquid, such as methanol, ethanol, isopropanol, acetone, dimethylformamide or dimethyl sulfoxide or mixtures of these with water and such solutions extended with water. The concentration of the solution may vary from 2% to 98% with a preferred range being 25% to 75%.

For the preparation of emulsifiable concentrates, the compound may be dissolved in organic solvents, such as xylene, pine oil, orthodichlorobenzene, methyl oleate, or a mixture of solvents, together with an emulsifying agent which permits dispersion of the pesticide in water. The concentration of the active ingredient in emulsion concentrates is usually 10% to 25% and in flowable emulsion concentrates, this may be as high as 75%.

Wettable powders suitable for spraying, may be prepared by admixing the compound with a finely divided solid, such as clays, inorganic silicates and carbonates, and silicas and incorporating wetting agents, sticking agents, and/or dispersing agents in such mixtures. The concentration of active ingredients in such formulations is usually in the range of 20% to 98%, preferably 40% to 75%.

Dusts are prepared by mixing the 1,2,4-triazoles with finely divided inert solids which may be organic or inorganic in nature. Materials useful for this purpose include botanical flours, silicas, silicates, carbonates and clays. One convenient method of preparing a dust is to dilute a wettable powder with a finely divided carrier. Dust concentrates containing 20% to 80% of the active ingredient are commonly made and are subsequently diluted to 1% to 10% use concentration.

The 1,2,4-triazoles can be applied as fungicidal sprays by methods commonly employed, such as conventional high gallonage hydraulic sprays, low gallonage sprays, airblast sprays, aerial sprays and dusts. The dilution and rate of application will depend upon the type of equipment employed, the method of application and diseases to be controlled, but the amount is usually 0.1 lb. to 25 lbs. per acre of the active ingredient.

As a seed treatment, the amount of toxicant coated on the seed is usually at a dosage rate of about 0.1 to 20 ounces per hundred pounds of seed. As a soil fungicide the chemical may be incorporated in the soil or applied to the surface usually at a rate of 0.1 to 25 lbs. per acre. As a foliar fungicide the toxicant is usually applied to growing plants at a rate of 0.25 to 10 pounds per acre.

The substituted 1,2,4-triazoles of this invention are also of interest when mixed with fertilizers and fertilizing materials. Such mixtures with fertilizers may be made in a variety of ways. For example, liquid formulations may be sprayed onto particles of mixed fertilizer or of fertilizer ingredients, such as ammonium sulfate, ammonium nitrate, ammonium phosphate, potassium chloride or sulfate, calcium phosphate or urea, singly or in admixture. Also, the toxicants and the solid fertilizing materials may be admixed in mixing or blending equipment similarly, a solution of toxicants in a volatile solvent may be applied to particles of fertilizer or fertilizer ingredients. A particularly useful form in which the toxicants are incorporated with fertilizers is in granular formulations. This type of solid composition serves a dual purpose in providing fertilizing material for the rapid growth of desired plants and at the same time helps control fungal diseases in one operation without the necessity of separate applications.

The compound of this invention were evaluated as foliar fungicides for the control of wheat leaf rust, *Puccinia recondita*. In this test aqueous sprays were applied to about one week old wheat seedlings and the plants were allowed to dry. They were then inoculated with standard spore suspension of the wheat leaf rust organism containing approximately 25,000 spores per ml. The plants were then held under standard conditions for the disease to develop. After about 7–9 days, lesions were counted and compared to those on untreated plants. The percent disease control was calculated. In a related test in order to determine the persistency of the sprays, the treated plants were rained upon for varying times in a standard rain machine in which six minutes of rain was equal to about one inch of rain. Table III gives the results. Dashes indicate no data.

TABLE III

[Wheat leaf rust control by foliar application]

| Example Number | Percent control (without rain) | | Percent control (with 1" of rain) | |
|---|---|---|---|---|
| | 1 lb. | 0.25 lb. | 1 lb. | 0.25 lb. |
| 1 | 10 | 10 | 0 | 0 |
| 2 | 100 | 100 | 99 | -- |
| 3 | 95 | 90 | 85 | 45 |
| 4 | 94 | 88 | -- | -- |
| 5 | 78 | 64 | -- | -- |
| 6 | 100 | 100 | -- | 99 |
| 7 | 87 | 94 | 97 | -- |
| 8 | 73 | 66 | 96 | 67 |
| 9 | 100 | 100 | 98 | 98 |
| 10 | 100 | 100 | -- | 100 |
| 11 | 20 | 10 | 0 | 0 |

The compounds of this invention have exhibited excellent systemic activity in the control of cereal rusts.

As one test for systemic activity the compounds were evaluated by a root-uptake method. In the root-uptake test one of the active compounds of this invention, contained in a suitable formulation, was incorporated into the soil by either spraying it into a rotating drum of soil, or by drenching the soil. The dosage of active ingredient in the soil ranged from about 50.0 to about 2.5 parts per million (p.p.m.). Seeds of a susceptible wheat variety were planted in the treated soil and allowed to germinate and grow to a height of about 4 inches. The plants were then inoculated with a spore suspension of *Puccinia recondita*. The plants sprayed with spores of the rust fungus were then held at 70° F. in a moist chamber about 16 hours to permit infection. The lesions were alloyed to develop about one week and were then counted in comparison to untreated plants and the percent disease control calculated.

The compounds of this invention may be utilized as the sole biocidal agents, alone or in admixture, or they may be employed in conjunction with other fungicides or with insecticides, miticides, bird repellents and comparable pesticides.

Fungicides which may be combined with the 1,2,4-triazoles of this invention include dithiocarbamates and derivatives such as ferric dimethyldithiocarbamate (ferbam), zinc dimethyldithiocarbamate (ziram), manganese ethylenebisdithiocarbamate (maneb) and its coordination product with zinc ion, zinc ethylenebisdithiocarbamate (zineb), tetramethylthiuram disulfide (thiram) and 3,4 - dimethyl - 1,3,5 - 2H - tetrahydrothiadiazine-2-thione; nitrophenol derivatives such as dinitro - (1-methylheptyl)phenyl crotonate (dinocap), 2 - sec - butyl - 4,6-dinitrophenyl 3,3 - dimethylacrylate (binapacryl) and 2-sec-butyl-4,6-dinitrophenyl isopropyl carbonate, heterocyclic structures such as N-trichloromethylthiotetrahydro-phthalimide (captan),
N-trichloromethylthiophthalimide (folpet),
2-heptadecyl-2-imidazoline (glyodin),
2,4-dichloro-6-(o-chloroanilino)-s-triazine,
diethyl phthalimidophosphorothioate,
5-amino-1-[bis(dimethylamino)phosphinyl]-3-phenyl-1,2,4-triazole,
5-ethoxy-3-trichloromethyl-1,2,4-thiadiazole,
2,3-dicyano-1,4-dithiaanthraquinone (dithianon),
2-thio-1,3-dithio-[4,5-b]quinoxaline (thioquinox),
1-(butylcarbamoyl)-2-benzimidazole carbamic acid methyl ester,
4-(2-chlorophenylhydrazono)-3-methyl-5-isoxazolone,
pyridine-2-thiol-1-oxide,
8-hydroxyquinoline,
2,3-dihydro-5-carboxanilido-6-methyl-1,4-oxathiin-4,4-dioxide, and
bis(p-chlorophenyl)-3-pyridinemethanol;

and miscellaneous fungicides such as dodecylguanidine acetate (dodine),
3-[2-(3,5-dimethyl-2-oxycyclohexyl)-2-hydroxyethyl] glutarimide (cycloheximide),
phenylmercuric acetate,
N-ethylmercuri-1,2,3,6-tetrahydro-3,6-endomethano-3,4,5,6,7,7-hexachlorophthalimide,
phenylmercuric monoethanolammonium lactate,
2,3-dichloro-1,4-naphthoquinone,
1,4-dichloro-2,4-dimethoxybenzene,
p-dimethylaminobenzenediazo sodium sulfonate,
2-chloro-1-nitropropane, polychloronitrobenzenes such as pentachloronitrobenzene, methyl isothiocyanate, fungicidal antibiotics such as griseofulvin or kasugamycin, tetrafluorodichloroacetone, 1-phenylthiosemicarbazide, Bordeaux mixture, nickel-containing compounds and sulfur.

What is claimed is:
1. 4(2-benzothiazyl)1,2,4-triazole.

No references cited.

NICHOLAS S. RIZZO, Primary Examiner

J. TOVAR, Assistant Examiner

U.S. Cl. X.R.

260—247.5 R, 256.4 N, 296 R, 306.8 R, 308 R; 424—270